Feb. 13, 1940.   W. FOURNAUX   2,190,062
PRESELECTOR DEVICE FOR CHANGE SPEED GEARS
Filed July 14, 1937   4 Sheets-Sheet 1
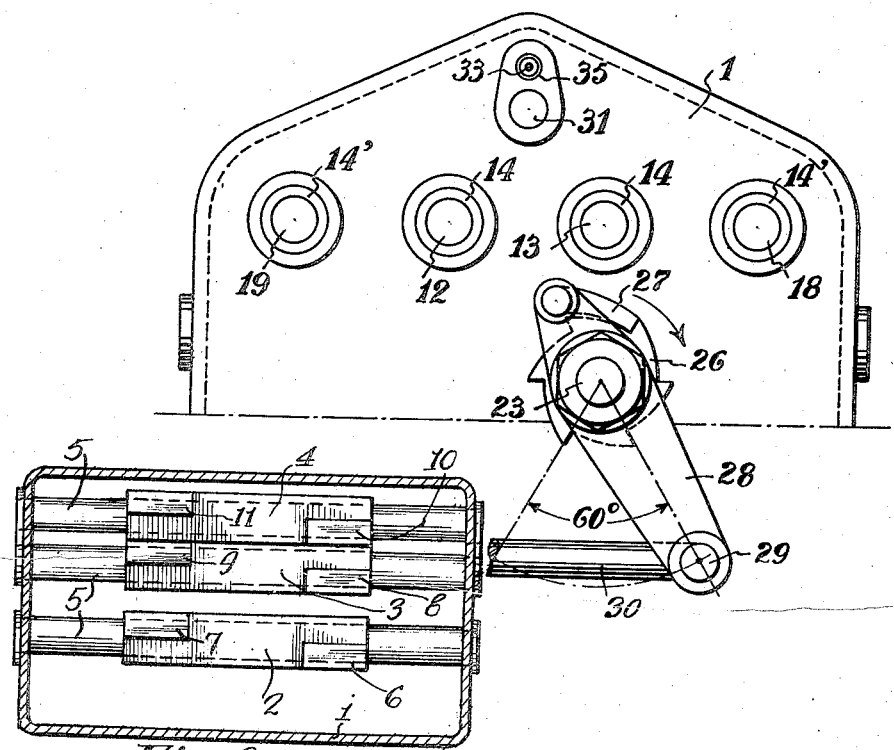
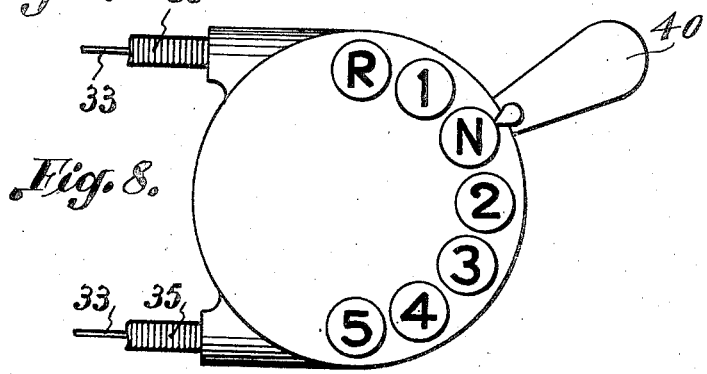

Feb. 13, 1940.  W. FOURNAUX  2,190,062
PRESELECTOR DEVICE FOR CHANGE SPEED GEARS
Filed July 14, 1937  4 Sheets-Sheet 2

Feb. 13, 1940.    W. FOURNAUX    2,190,062
PRESELECTOR DEVICE FOR CHANGE SPEED GEARS
Filed July 14, 1937    4 Sheets-Sheet 4

Patented Feb. 13, 1940

2,190,062

UNITED STATES PATENT OFFICE 2,190,062

PRESELECTOR DEVICE FOR CHANGE SPEED GEARS

Walthère Fournaux, Waterloo, Belgium

Application July 14, 1937, Serial No. 153,590
In Belgium July 17, 1936

3 Claims. (Cl. 74—334)

The present invention has for its object a mechanical device which, by means of preselection and merely by the operation of the driver without employing any additional source of energy such as electricity or the vacuum created by the engine, ensures the functioning of sliding gears for motor cars and motor cycles. The choice of the speed or the preselection is obtained manually, change of the selected speed taking place automatically when de-clutching is carried out by the driver at the desired moment.

The advantages of the device are the simplicity with which it can be operated by elimination of the usual ball lever, the synchronisation of de-clutching and of changing speed, the rapidity of execution, the elimination of all drawbacks coming from electric, pneumatic or hydraulic systems, the ability of application of the device to motor cycles which usually have a single cylinder which does not permit of the utilisation of a system other than a mechanical one, and the application of the device to gear boxes whatever may be the number of speeds without involving the introduction of modifications other than a number of corresponding sliding forks.

The mechanical preselector according to this invention is of the type in which the mechanical elements of the device are mounted in a casing fixed on the upper part of the gear box and being in the form of forks sliding on guides supported in the casing, the lower ends of these sliding forks acting on the pinion of the gear box.

This invention is characterised by the provision of stops at the ends of the upper parts of the sliding forks, cam wheels mounted on guides arranged transversely above the sliding forks so as to turn in opposite direction to displace the forks forward or backward and adapted to be slid axially by a sliding fork, drums with cams also mounted above these sliding forks and parallel to the shafts of the said cam wheels so as to return the forks to neutral, gear wheels connected respectively to the shafts of the cam wheels and of the drums, pinions and intermediate elements mounted partly within the said casing and partly externally of it and connected to the clutch pedal or other lever the movements of which effect the change of gear by displacement in unison of the said cam wheels and cam drums, a sliding yoke mounted longitudinally above the axles of the said cam wheels and acting on the latter by a pull exerted by a suitable manual control in order to effect preselection of the desired gear ratio.

One form of construction of the device as applied to a gear box having five forward speeds and a reverse is shown by way of example on the annexed drawings, in which:

Fig. 1 is an external view taken on line 1—1 of Fig. 4 showing the change speed control and the preselector device.

Fig. 8 is a view of the hand lever by which the preselection is effected and

Fig. 9 is a plan view showing the neutral position of the stops and sliding forks.

Figure 2:
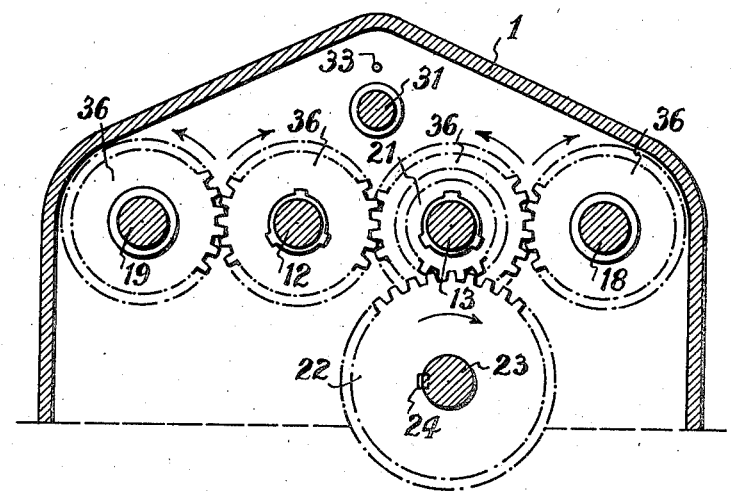
Fig. 2 is an external view, in vertical section taken on line 2—2 of Fig. 4, showing the geared control shafts.

The mechanical preselector device for changing speeds is formed by a casing 1 situated at the upper part of the gear box which encloses the mechanical elements. The latter comprise three sliding forks 2, 3, 4 connected on the one hand on the pinions, which respectively effect reverse and first speed, second and third and fourth and fifth speeds, and which forks slide on the other hand on rods 5 held at their ends in the casing. These sliding forks have each at their upper part two stops 6 and 7 for the sliding fork 2, stops 8 and 9 for the sliding fork 3, and stops 10 and 11 for the sliding fork 4, the stops located on the same sliding fork being offset relatively to one another (Figs. 4–7). Two cam wheels 15 and 16 are slidably mounted on two hollow axles 12 and 13 arranged transversely above the sliding forks, the ends of the axles being journalled in rings 14 secured to the casing. The cam wheels are each provided with three cams 17 having the same breadth as a stop and swing to the rotation of the axles and wheels coming into contact with and forcing one of the stops 6, 8 and 10 for the wheels 16 and the stops 7, 9 and 11 for the wheels 15.

Figure 3:
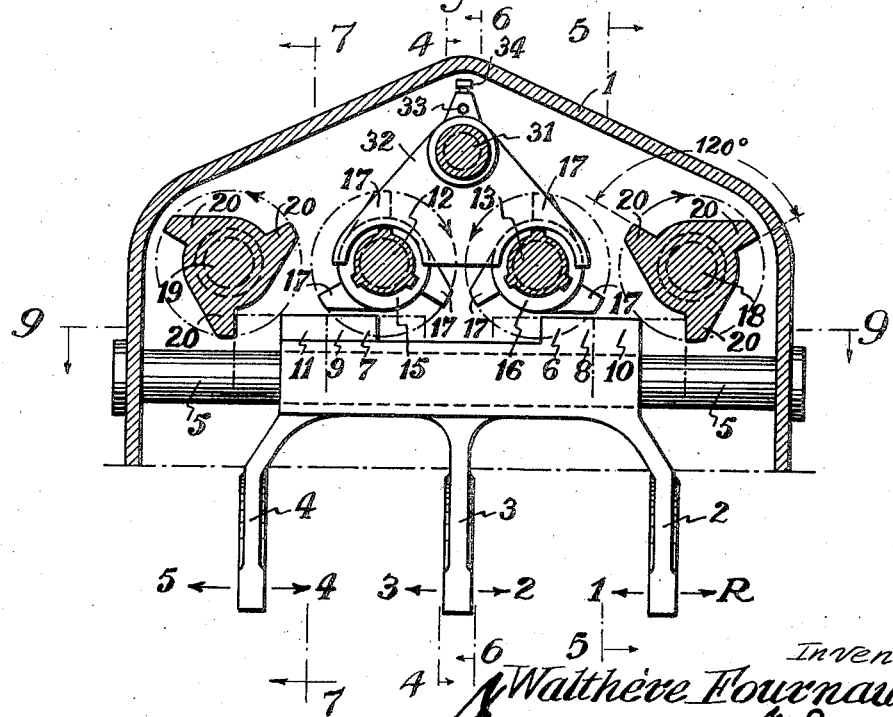
Fig. 3 is an internal vertical section showing the sliding forks and their respective cam actuating elements.
Figure 4:
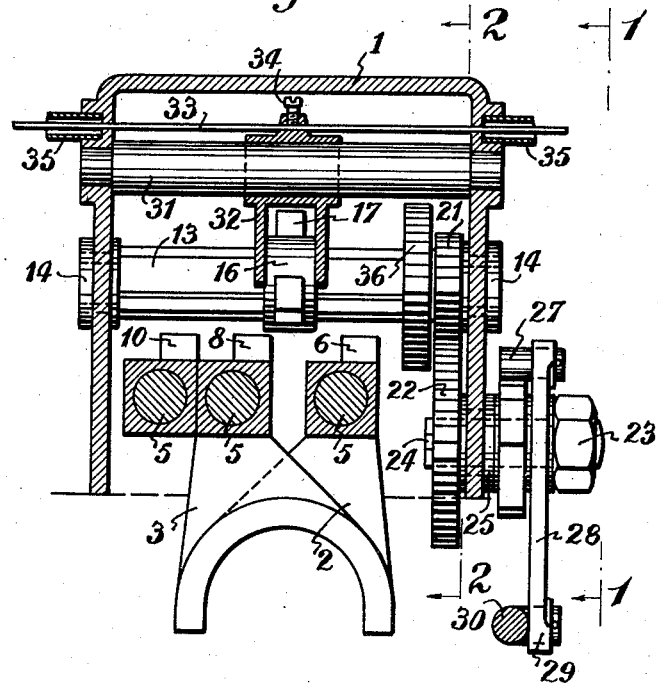
Fig. 4 is a transverse section taken on line 4—4 of Fig. 3 showing the control device for changes of speed, the sliding forks and the elements for changing into reverse, into second and into fourth speeds and the preselector device.
Figure 5:
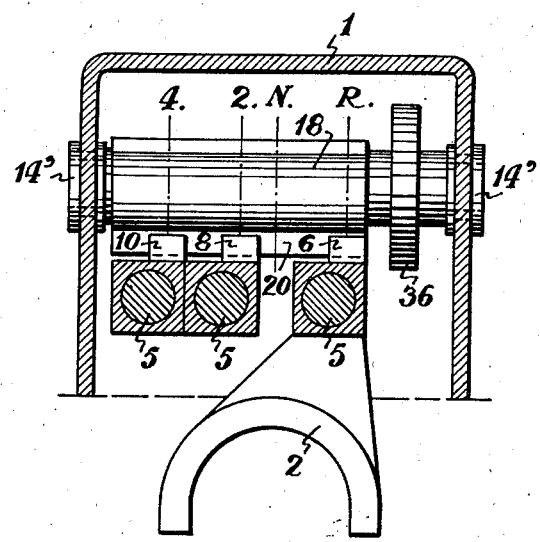
Fig. 5 is a transverse section taken on line 5—5 of Fig. 3 showing one of the long cams for returning the parts into neutral from reverse, second and fourth speeds.
Figure 6:
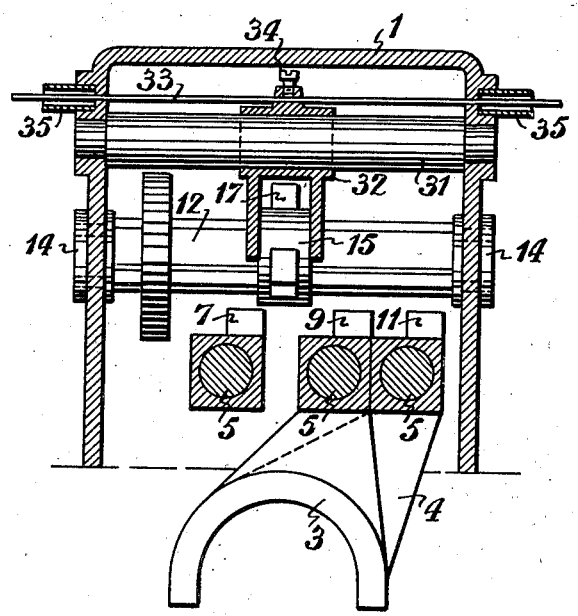
Fig. 6 is a cross-section taken on line 6—6 of Fig. 3 with the sliding forks and their elements for changing into first, third and fifth speeds, as well as the preselector device.
Figure 7:
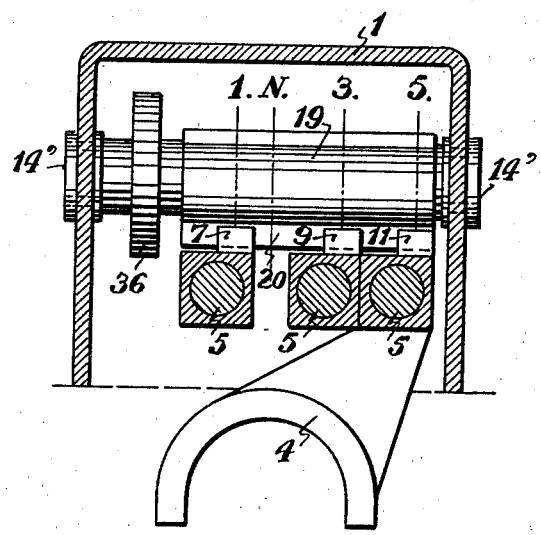
Fig. 7 is a transverse section taken on line 7—7 of Fig. 3 showing the neutral positioning of the first, third and fifth speeds.

On the other hand, drums 18 and 19 are also arranged above the sliding forks and transversely of the latter but parallel to the guides 12 and 13, the ends of these drums being carried in bushings 14' fixed to the casing. These drums are each provided with three cams 20 of similar shape to the cams 17 and also spaced apart from one another at an angle of 120°, but being of a breadth equal to the length of the drums and adapted to be brought by rotation into contact severally with the stops 6, 8 and 10 for the drum 18 and with the stops 7, 9 and 11 for the drum 19. The rotation of the guides 12 and 13 and of the drums 18 and 19 is effected by four intermeshing gear wheels 36 forming a geared connection. These gears all possess the same number of teeth and are mounted respectively on the guides 12 and 13 and the drums 18 and 19. The guide 13 is a driving one and imparts to each of the axles and the drums a different direction of rotation, as shown in Figs. 2 and 3. Rotation of the guide 13 is effected by means of a small pinion 21 mounted on said guide and meshing with a pinion 22 which has double the number of teeth, this latter pinion being mounted on a shaft 23 by means of a key 24. The shaft 23 is carried in a bushing 25 secured to the casing (Fig. 4), and is controlled externally of the latter by a wheel 26 having ratchet teeth (Fig. 1), a pawl 27 and a lever arm 28, the latter being connected to the clutch pedal or other actuating lever by a rod 30 pivoted at 29. The connection is regulated in such manner that the forward movement of the clutch pedal causes a displacement of the lever 28 at an angle of 60°.

A sliding yoke 32 is slidably mounted on a rod 31 secured at its ends to the casing and arranged longitudinally and above the guides 12 and 13, this sliding yoke 32 serving to displace the cam wheels 15 and 16 simultaneously relatively to the stops of the sliding forks or relatively to the space existing between the sliding forks 2, 3. This position between the forks 2 and 3 is that of placing the gears into neutral (Figs. 4 and 6) on actuation of the clutch pedal. Displacement of the sliding yoke 32 in one direction or the other is effected by the pull exerted from a hand lever 40, Fig. 8, upon one or other of the parts of a cable 33 secured to the sliding yoke 32 by a pressure screw 34. The pull on the two parts of the cable which passes into a sheath 35 can be effected by the aid of any suitable element 40 situated within reach of the driver; the act of displacing the sliding yoke 32 constituting pre-selection.

The functioning of the device shown in neutral position in Figs. 1–7, is as follows:

In order to select the first speed, the driver moves the cam wheels 15 and 16 through the medium of the cable 33 and the sliding yoke 32, into plane of the stop 7 of the sliding fork 2. The pressure then exerted on the clutch pedal causes displacement of the lever 28 through an angle of 60° which, by means of the gear elements 22, 21, 36 and the guides 12 and 13, causes a rotary movement of the drums 18 and 19 and the wheels 15 and 16 through an angle of 120° in the direction of the arrows. The cams 20 of the drums 18 and 19 are set in such manner that they are always 60° in advance of the cams 17 of the wheels 15 and 16. They do not come into contact with any stop because the sliding forks are already in neutral position and can thus freely move through 120°. During this period, the cams 17 of the wheel 15 are moved freely through 60° and then through a second 60° forcing the stop 7 of the sliding fork 2 into the first speed position. During this period the cams 17 of the wheel 16 have moved through an angle of 120°, not encountering any stop in their travel.

To pass from first to second speed, the cam wheels 15 and 16 are brought into the plane of the stops 8 of the sliding forks 3 of the second speed. During the rotary movement of the drum 19 one of its cams 20 come into engagement with the stop 7 of the sliding fork 2 then in the position of the first speed and moves it through an angle of 60° into neutral position. At the same time the wheel 16 has also moved through an angle of 60° and one of its cams 17 is in contact with the stop 8 of the sliding fork 3 which it thereafter moves through an angle of 60° into the position of second speed. During this time the cam 20 of the drum 19 continues its rotary movement freely and the cam 17 of the wheel 15 as well as the cams 20 of the drums 18 move through an angle of 120° owing to the fact that there is no abutment to be encountered in their passage. The travel of the forks in either direction, that is to say towards the position of engagement or towards the neutral position, is determined by the height of the cams 20 of the drums 18 and 19 and the cams 17 of the wheels 15 and 16.

Engagement of each of the other speeds as well as reverse always takes place in the same manner by displacement of the wheels 15 and 16 into the plane of the corresponding stop of the sliding fork of the selected speed. It is to be understood that the wheel 15 acts positively for the first, third and fifth speeds, and the wheel 16 in the opposite direction for reverse and for the second, and fourth speeds. The drum 19 serves the purpose of returning the sliding forks of the first, third and fifth speeds to the neutral position, the drum 18 acting similarly but in opposite direction for the second and fourth speeds and reverse. The arrangement of these elements always ensures prior to the engagement of the selected speed, the return to neutral position of the speed previously engaged.

The bringing of the device to neutral position is effected by placing the cam wheels 15 and 16 between the sliding forks 2 and 3 where the passage of the cams 17 is unobstructed owing to the absence of any abutment.

The functioning of the movement from a lower to a higher gear is similar to that from a higher to a lower gear, and permits of selection of any speed, whether the vehicle is in motion or is stationary. Each fork in its displaced or gear position rests against a neutralising cam 20 which is therefore ready, on displacement of the clutch pedal, to throw that fork inwards to neutral position.

Having thus described my invention, I claim:

1. In a preselective control for sliding-gear transmissions, a casing over a transmission to be controlled, longitudinal rods in said casing, gear-engaging forks slidable on said rods, primary rotary cams slidable transversely above the forks and adapted to displace the same over the rods, gear means for rotating said cams and thereby shifting the forks and corresponding gears, secondary cams actuated simultaneously with the first for retracting previously shifted forks, means for selectively and remotely sliding the primary cams, and manually actuated means for moving the cam-actuating gear means, and a ratchet mechanism for unidirectionally actuating the manually actuated means.

2. In a preselective control for sliding gear transmissions, a casing associated with a transmission to be controlled, longitudinal rods in said casing, gear shifting forks slidable on the rods, toothed cams movable transversely above the forks and adapted to push said forks a given distance in one direction, a yoke engaging the cams and movable therewith over selected forks, a second set of cams for returning the moved forks to their original position, interconnected gears for simultaneously revolving all cams, means for manually actuating said gears, remote control means for shifting the yoke to selective gear-shifting positions, and ratchet means on the gear actuating means for actuating said gears in one direction only.

3. A preselector of the character described, comprising in combination with a vehicle speed-change gear transmission, said vehicle having a clutch, a casing associated with the transmission, rods mounted longitudinally in said casing over the transmission gears, shifting forks slidable on said rods and engaging the transmission gears for shifting the latter, rotary cams having teeth engageable with the forks for moving said forks in a direction away from the transverse axis of the casing, stops on the upper ends of the forks for engagement with the cam teeth, a second set of toothed cams acting on the outer edge of the stops for returning the forks to their original central position, a yoke engaging the first cams and adapted to slide the same over the forks, a gear train interconnecting the cams for simultaneously rotating same in reverse directions with respect to each other, a ratchet mechanism for unidirectionally rotating one gear of the train, means connecting said mechanism to the vehicle clutch, and remote control means for selectively positioning transversely of the casing the first cams moving yoke.

WALTHÈRE FOURNAUX.